Dec. 30, 1924.
A. V. GULLBORG
1,521,020
ANTIFRICTION INSERT FOR LEAF SPRINGS
Filed July 17, 1919
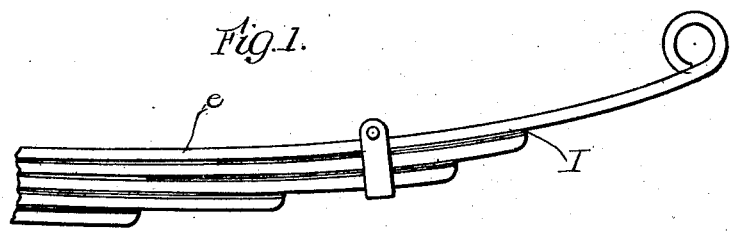
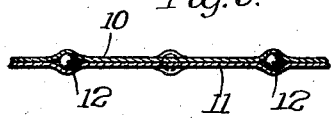
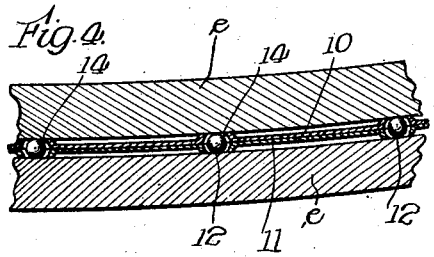
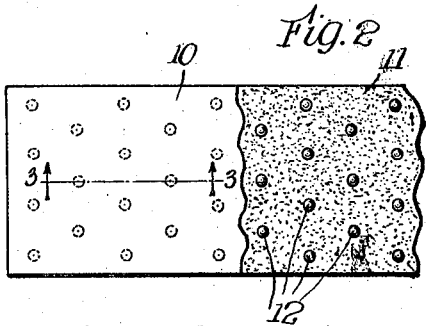
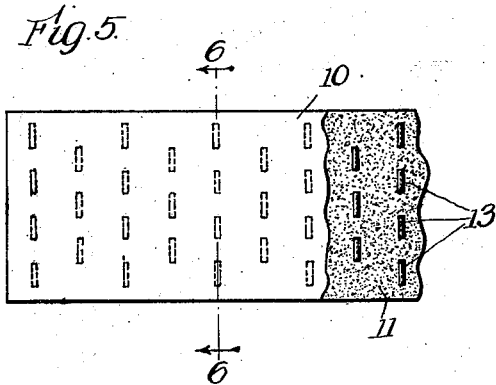
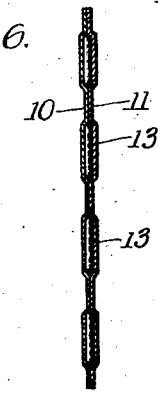
INVENTOR
Arthur V. Gullborg,
By Schmidt & Hanson
ATTORNEYS
Witness:
A. J. Sauser.

Patented Dec. 30, 1924.

1,521,020

UNITED STATES PATENT OFFICE.

ARTHUR V. GULLBORG, OF CHICAGO, ILLINOIS.

ANTIFRICTION INSERT FOR LEAF SPRINGS.

Application filed July 17, 1919. Serial No. 311,548.

*To all whom it may concern:*

Be it known that I, ARTHUR V. GULLBORG, a citizen of the United States, and a resident of Chicago, in the county of Cook, State of Illinois, have invented certain new and useful Improvements in Antifriction Inserts for Leaf Springs, of which the following is a specification.

My invention relates to anti-friction inserts for leaf springs to be placed between the spring leaves to reduce the friction as they slide relatively during travel of a vehicle. Different devices and arrangements have been used for reducing the friction between spring leaves, but such means have been complicated, expensive, and not very practical or efficient.

The object of my invention is to produce inexpensive, practical and efficient anti-friction inserts in the form of fabric which can be cut into the desired size or length to be inserted between the spring leaves. My improved fabric comprises preferably non-metallic supporting body and metallic anti-friction members supported thereby. Material, such as paper, cloth or fiber may be used for the body and steel balls or rollers, or wires may be used for the anti-friction members. When inserted between the leaves of a spring, the body part of the material serves primarily to hold the anti-friction members in properly placed position between the leaves, and the anti-friction members then take up the pressure between the leaves and reduce the friction during travel of the vehicle. Preferably the material body is in the form of superposed sheets between which the anti-friction members are located and secured. The fabric is preferably made continuous in the form of ribbons of standard width, and these ribbons can be rolled up into rolls from which a desired length of ribbon may then be cut to be inserted between the spring leaves where desired. The cost of the fabric being comparatively very little, worn out insert lengths can be discarded and new lengths inserted.

The details of my invention are clearly shown on the accompanying drawings, in which Fig. 1 is a side elevational view of the end of a spring showing inserts between its leaves, Fig. 2 is a plan view of a section of insert ribbon showing balls used as the anti-friction members, Fig. 3 is an enlarged sectional view on plane 3—3, Fig. 2, Fig. 4 is an enlarged longitudinal sectional view of a length of the spring showing the operation of the insert, Fig. 5 is a plan view of a length of insert ribbon of modified construction, and Fig. 6 is an enlarged sectional view on plane 6—6, Fig. 5.

In Fig. 1, my improved inserts I, are inserted between the various leaves $e$ of a vehicle spring, there being considerable relative longitudinal movement between the leaves at their ends during travel of the vehicle. In Fig. 2, I have shown one form of insert fabric. The fabric is in the form of a ribbon comprising the opposed halves 10 and 11, which are shown secured together by gumming, although they may be secured together by sewing or other means. Between the halves and properly spaced are the anti-friction balls 12 the diameter of the balls being somewhat greater than the combined thickness of the halves. Where glue is used to secure the halves of the ribbon together, the glue can first be applied to one of the halves, and the anti-friction members applied and stuck thereto, and the other half then applied, the balls being then securely held in their spaced position. I have found that paper is a very good material for the fabric, although fiber, cloth and other material could be used. The insert ribbon could be readily formed continuously by suitable machinery, and wound up into rolls to be sold in bulk, or by the yard.

Figs. 5 and 6 show a modified arrangement, short cylindrical sheet wire lengths 13 being used instead of balls, the wires or rollers being arranged in transverse rows between the halves of the ribbon.

When insert material is to be applied between the leaves of a spring the leaves are suitably spread apart and the proper lengths cut from the ribbon roll. These lengths are then readily inserted between the leaves, and the leaves are released to assume their normal position. The material supporting the anti-friction members is such that the pressure of the springs will tear or crush it to permit the springs to come into direct contact with the anti-friction members. During travel of the vehicle, the spring ends shift relatively longitudinally short distances, and the anti-friction members are therefore rolled back and forth, the displacement of the members being however, very slight. As the members roll back and forth, they push aside the body material and form pockets for themselves. These pockets 14 hold the anti-friction members within limited fields between the spring leaves and the members roll freely as the leaves move relatively, the friction being thus greatly reduced.

If desired the material forming the ribbon halves may be treated to be waterproof, or may be treated with some lubricating material such as oil or paraffine, or other suitable material may be applied. Such material would be retained in the spaces between the surfaces of the ribbon and the spring leaves so that during travel of a vehicle the lubricating material will find its way to the anti-friction members and keep them well lubricated.

As the balls or rollers are of hard steel and their diameters are small, they will be pressed into the spring leaves sufficiently to form opposed pockets, which pockets will serve independently of the ribbon material to keep the anti-friction members properly spaced between the spring leaves. After the members become worn, or the fabric is destroyed, the ribbon lengths can readily be withdrawn from between the leaves, and new lengths inserted.

I thus produce anti-friction insert means which is inexpensive, yet which is very practical and has proven itself to be very efficient. I do not, of course, desire to limit myself to the exact construction and arrangement shown and described, as modifications are no doubt possible, which would still come within the scope of the invention.

Having described my invention, I claim as follows:

1. Anti-friction insert for spring leaves consisting of two layers of material glued together, and metallic anti-friction members spaced and secured between said layers.

2. Anti-friction insert for leaf springs consisting of a ribbon formed of two lengths of papers glued together, and anti-friction members spaced and secured between said strips.

3. An anti-friction insert, comprising a sheet of material adapted readily to wear by attrition, and having embedded therein a plurality of hardened bearing members.

4. Anti-friction insert for leaf springs consisting of non-metallic fabric and metallic bearing members embedded therein.

5. An anti-friction insert comprising a retaining member having bearing members completely embedded therein adapted to be exposed to attrition.

6. Anti-friction means for leaf springs comprising a ribbon formed of two strips of paper glued together and metallic roller bearing members spaced and secured between said strips.

7. Anti-friction means for leaf springs consisting of two layers of flexible fabric secured together throughout their extent and metallic roller bearing members spaced and confined between said layers.

8. Anti-friction means for leaf springs comprising a sheet of crushable material and anti-friction members held in fixed relative positions thereon, said material facilitating the application of the anti-friction members between the leaves of springs.

9. Anti-friction means for leaf springs of vehicles consisting of a sheet and anti-friction members, said members being primarily immovably fixed on said sheet but the material of said sheet adjacent said members being readily yieldable laterally to pressure to permit said members to form rolling slots for themselves when said sheet is inserted between the leaves of a leaf spring and said leaves move relatively under pressure.

10. Anti-friction means for insertion between the leaves of a leaf spring consisting of a thin band and anti-friction members, and securing means normally of sufficient strength to hold said anti-friction members in fixed spaced relationship to said band but crushable under pressure to permit said members to form rolling slots therein when under pressure during relative movement of the spring leaves.

11. The process of forming an anti-friction bearing consisting of embedding bearing members in a sheet and inserting said sheet between relatively movable members which tend to a rubbing action between one another and which act against the opposite sides of the embedded bearing members to confine the same to a certain line of movement and to force the same to form depressions in the relatively movable members.

12. The process of forming an anti-friction bearing consisting of securing bearing members in a sheet of retaining material and inserting said sheet between relatively movable members which tend to a rubbing action causing the bearing members to wear spaces in the retaining sheet surrounding them and to subsequently roll depressions in the relatively movable members.

13. The process of forming a bearing to reduce friction between relatively movable members which normally slidably engage each other, consisting of securing hardened bearing members in a sheet of material softer than the relatively movable members, inserting said sheet between the relatively movable members whereupon anti-friction bearing surfaces are formed by the rubbing action of the relatively movable members which causes the bearing members to move relative to said relatively movable members and to the sheet of securing material.

14. The combination with relatively movable members adapted to normally contact each other, of bearing members interposed between said members, and heterogeneous retaining means adapted to temporarily restrain the bearing members from relative movement with respect to said retaining means.

15. The combination with relatively movable members adapted to normally contact each other, of bearing members interposed between said relatively movable members, and retaining means for the bearing members, portions of which are adapted to be worn away by the rubbing action of the relatively movable members.

16. The process of forming an anti-friction bearing consisting of securing bearing members in a sheet of retaining material and inserting said sheet between relatively movable members which tend to a rubbing action to effect the wearing away of the retaining sheet adjacent the bearing members.

17. The process of forming a bearing to reduce friction between relatively movable members, consisting of embedding bearing members of material harder than the relatively movable members in a homogeneous sheet of material softer than the relatively movable members and inserting the sheet of material between the relatively movable members.

18. The process of forming a bearing to reduce friction between relatively movable members, consisting of embedding hardened bearing members in a sheet of relatively soft material and inserting said sheet between the relatively movable members, whereupon the rubbing action of said relatively movable members causes the wearing away of a portion of the relatively soft material adjacent the bearing members and the subsequent forming of depressions in the relatively movable members.

19. The process of forming a bearing for reducing friction between relatively movable members, consisting of embedding bearing members in relatively soft material and inserting said material between the relatively movable members, whereupon the rubbing action of said relatively movable members acts to wear away a portion of said relatively soft material between the bearing members and the relatively movable members to wear a space in the relatively soft material around certain of the bearing members and to subsequently roll depressions in the relatively movable members adjacent each of the bearing members.

In witness whereof, I hereunto subscribe my name this twelfth day of July A. D., 1919.

ARTHUR V. GULLBORG.